(12) United States Patent
Lueftner

(10) Patent No.: US 7,404,654 B2
(45) Date of Patent: Jul. 29, 2008

(54) REARVIEW MIRROR FOR A VEHICLE

(75) Inventor: Robert Lueftner, Dorfprozelten (DE)

(73) Assignee: Magna Donnelly GmbH & Co. KG, Dorfprozelten (DE)

( * ) Notice: Subject to any disclaimer, the term of this patent is extended or adjusted under 35 U.S.C. 154(b) by 253 days.

(21) Appl. No.: 11/141,120

(22) Filed: May 31, 2005

(65) Prior Publication Data
US 2005/0270789 A1 Dec. 8, 2005

(30) Foreign Application Priority Data
Jun. 3, 2004 (DE) .................. 20 2004 008 856 U

(51) Int. Cl.
*B60Q 1/26* (2006.01)
*F21V 5/04* (2006.01)
(52) U.S. Cl. ................. 362/494; 362/140; 362/520; 362/540
(58) Field of Classification Search ................. 362/494, 362/135, 140–144, 520, 540
See application file for complete search history.

(56) References Cited

U.S. PATENT DOCUMENTS

| | | | |
|---|---|---|---|
| 5,037,182 A | | 8/1991 | Groves et al. |
| 5,285,060 A | | 2/1994 | Larson et al. |
| 5,313,335 A | * | 5/1994 | Gray et al. .................. 362/494 |
| 5,361,190 A | * | 11/1994 | Roberts et al. ............... 362/464 |
| 5,587,699 A | | 12/1996 | Faloon et al. |
| 5,788,357 A | | 8/1998 | Muth et al. |
| 6,045,243 A | | 4/2000 | Muth et al. |
| 6,111,683 A | * | 8/2000 | Cammenga et al. ......... 362/494 |
| 6,152,590 A | * | 11/2000 | Furst et al. .................. 362/494 |
| 6,200,010 B1 | | 3/2001 | Anders |
| 6,227,689 B1 | * | 5/2001 | Miller ......................... 362/494 |
| 6,264,353 B1 | * | 7/2001 | Caraher et al. .............. 362/494 |
| 6,290,378 B1 | * | 9/2001 | Buchalla et al. ............. 362/494 |
| 2002/0014975 A1 | | 2/2002 | Lang et al. |
| 2003/0193814 A1 | | 10/2003 | Bukosky et al. |
| 2004/0170018 A1 | * | 9/2004 | Nawashiro .................. 362/244 |

FOREIGN PATENT DOCUMENTS

| | | |
|---|---|---|
| DE | 691 05 883 | 5/1995 |
| DE | 196 31 409 | 2/1998 |
| DE | 198 08 393 | 9/1999 |
| DE | 695 09 784 | 10/1999 |
| DE | 199 02 487 | 8/2000 |
| DE | 102 15 854 A1 | 10/2003 |
| EP | 0 475 502 | 3/1992 |
| EP | 0 789 653 | 8/1997 |
| EP | 1 022 190 A2 | 7/2000 |
| WO | WO 00/30892 | 6/2000 |

* cited by examiner

*Primary Examiner*—Alan Cariaso
(74) *Attorney, Agent, or Firm*—McGlew & Tuttle, P.C.

(57) ABSTRACT

A rearview mirror (01) for a vehicle with a partly transparent reflective element (03) for observing the traffic behind has at least one signaling mechanism with light-emitting lighting device (05, 07) provided on the rear side of the reflective element (03). The light of the signaling mechanism is radiated at a specific angle of radiation in a predominant direction (13, 14), so that the lighting strength on the front side of the reflective element (03) depends on the viewing angle relative to the predominant direction (13, 14). An optical convergent lens (11), which collects the light signals of the lighting device (05, 07) and deflects them in the direction of the predominant direction (13, 14), is arranged between the lighting device (05, 07) and the reflective element (03).

20 Claims, 2 Drawing Sheets

REARVIEW MIRROR FOR A VEHICLE

CROSS REFERENCE TO RELATED APPLICATION

This application claims the priority of German Application 20 2004 008 856.8 of Jun. 3, 2004 the entire contents of which application is hereby incorporated by reference in its entirety.

FIELD OF THE INVENTION

The present invention relates to a rearview mirror for a vehicle with a partly transparent reflective element for observing the traffic behind, whereby at least one signaling mechanism with light-emitting lighting feature is provided.

BACKGROUND OF THE INVENTION

Generic rearview mirrors on the one hand serve to observe the traffic behind and on the other hand as signaling mechanism to give the driver and/or other passengers and/or other drivers warning signals or reference signals. There the signaling occurs by sending out light signals, whereby light-emitting lighting means are arranged behind the reflective element serving to show the traffic behind.

So that the light signals of the signaling mechanism can be viewed by the observer on the front side of the reflective element, the reflective element is designed partly transparent. Such partly transparent reflective elements are also designated as so-called Venetian mirrors.

A generic rearview mirror is described for example in U.S. Pat. No. 6,045,243. In this rearview mirror a polarizing film is arranged between the lighting means and the reflective element, with which the light radiated by the lighting means can be deflected in a predominant direction. The result of this is that when the front side of the reflective element is viewed the illumination strength depends on the viewing angle relative to the predominant direction when the signaling mechanism is switched on. If the driver receives a warning for example, a predominant direction is selected, in which the signaling mechanism can be viewed clearly from the driving position alone. The warning signal cannot be viewed from the viewing direction of the traffic behind or to the side, since the light emitted by the lighting means is shaded in this direction by the polarizing film.

The disadvantage of the mirror described in U.S. Pat. No. 6,045,243 is that the polarizing film weakens the light overall, so that a relatively high density of light is required to ensure adequate illumination strength on the front side of the reflective element. This high light output in turn requires a relatively high electric power supply and causes high heat losses.

SUMMARY OF THE INVENTION

Based on this state of the art it is therefore the object of the present invention to provide a new rearview mirror with a direction-dependent radiating signaling mechanism, which avoids the drawbacks of the known prior art.

This task is solved by a rearview mirror according to the invention comprising a partly transparent reflective element for observing the traffic behind (the driver) whereby at least one signaling mechanism with light-emitting lighting means is provided on the rear side of the reflective element and whereby the light of the signaling mechanism is radiated at a specific angle of radiation in a predominant direction, so that the lighting strength on the front side of the reflective element depends on the viewing angle relative to the predominant direction. An optical convergent lens is provided which collects the light signals of the lighting means and deflects them in the direction of the predominant direction. The optical convergent lens is arranged between the lighting means and the reflective element.

The inventive rearview mirror is based on the principal idea of using a convergent lens for deflecting the light emitted by the lighting means. By appropriately shaping the convergent lens or respectively by suitable relative arrangement between convergent lens and lighting means it can very easily be ensured that the light emitted by the lighting means is bundled and deflected in a predominant direction. Here, the decisive advantage of convergent lenses is that only a very small portion of the light output is lost as it passes through the convergent lens. Therefore a lesser electric power supply can be used to reach a preset illumination strength, with the result that heat losses in particular are also less prevalent.

Basically any type of lighting means can be used to carry out the inventive rearview mirror. Light-emitting semiconductor diodes are particularly suitable, since these electronic components exhibit only a very slight loss in output and thus only minimal quantities of lost heat have to be discarded.

The shape of the convergent lens can be any at all. Convergent lenses, which are configured rotationally symmetrically to an optical central axis, can be manufactured particularly easily and cost-effectively. To achieve the desired deflection of the emitted light in a predominant direction, such rotationally symmetrically configured convergent lenses can be arranged relative to the lighting means such that the extension of the central axis of the convergent lens does not run through the center point of the lighting means. In such an arrangement the connecting line between the center point of the lighting means and the intersection of the optical central axis of the convergent lens results as the predominant direction of the light radiation.

If several signaling mechanisms are arranged under a reflective element, it is useful for cost-saving purposes to form the various convergent lenses required for light deflection by providing several lenticular or domed shapings on a transparent plate. These shapings are arranged on the plate such that when the plate is attached to the subjacent lighting means carrier in each case an offset occurs between convergent lens and assigned lighting means, causing the desired deflection of the emitted light in the predominant direction.

To prevent unwanted diffused light from entering through the reflective element, an opaque masking element, for example a colored plastic plate, which has openings for light to come through in the region of the lenticular shapings, can be arranged between the lighting means and the reflective element.

Through the inventive deflection of the emitted light in the predominant direction it is possible in particular for the signaling mechanism to radiate light either only in the direction of the driving position or only in the direction of a vehicle driving behind or respectively of a vehicle driving alongside. Thus specific signals, warning signals for example, can be displayed to the driver only, whereby the surrounding traffic is not distracted by these signals. Other signals, for example the direction of travel display, on the other hand are displayed only to traffic behind and alongside, without the driver being distracted by these light signals. Several punctiform signaling mechanisms can be arranged on the rear of the reflective element to form complex warning signals or reference signals. Here it is particularly conceivable that the signaling mechanisms are arranged according to a dot matrix and signal forms freely defined in the dot matrix are created by suitable actuation of individual light points.

Experience shows that the light density required for recognition of the light signal depends extensively on the lighting ratios in the environment. For example the signals must be displayed by day with a much greater light density than by night, so that despite the bright surroundings they are still sufficiently and reliably perceptible. There should therefore be a sensor available for measuring the lighting ratios in the surroundings, so that the light density of the light radiated by the signaling mechanism can be altered depending on this measuring result.

An embodiment of the invention is shown schematically in the diagrams and is explained by way of example hereinbelow. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
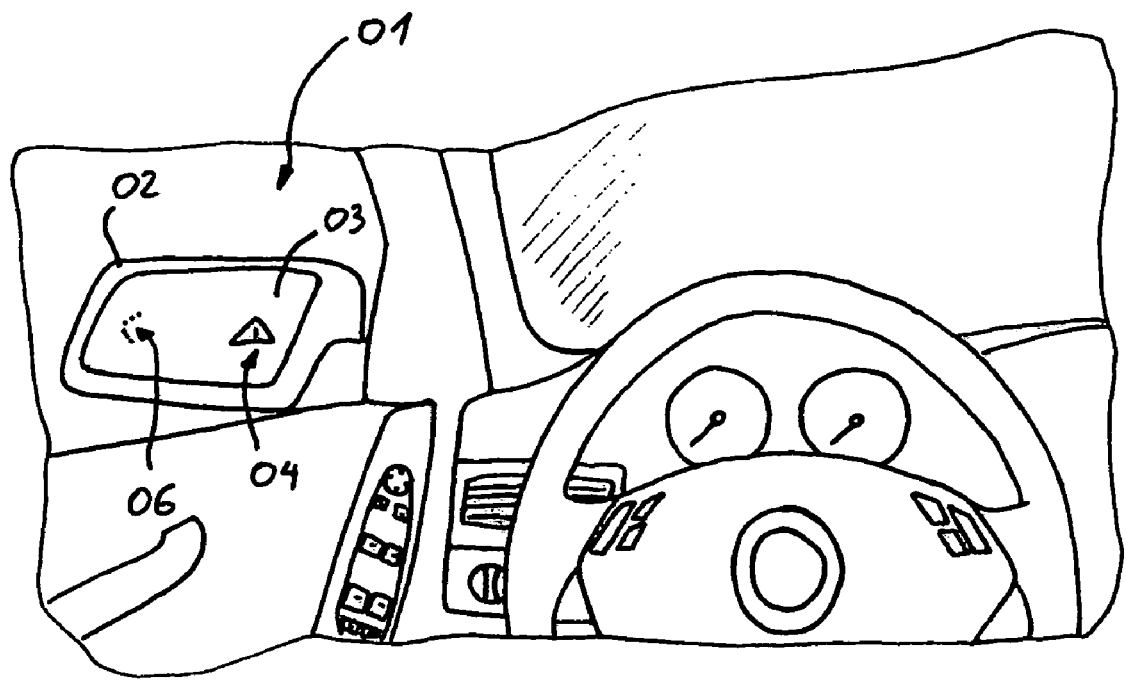
FIG. 1 is a perspective view from the viewing angle of the driving position showing an inventive rearview mirror.

FIG. 1 shows in a perspective view an external rearview mirror 01 from the viewing angle of the driving position. The external rearview mirror comprises a housing 02 and a reflective element 03. The reflective element 03 is partly transparent, so that a triangular warning signal 04 can be displayed for the driver by actuating the light means 05 arranged behind the reflective element 04 (see FIG. 2). In addition, the traffic behind can be shown an arrow reference signal 06 by operating lighting means 07, likewise arranged behind the reflective element 03, whereby the reference signal 06 in FIG. 1 is indicated only in dots, since it cannot be recognized from the viewing angle of the driving position due to the inappropriate angle of observation. This direction-dependent illumination strength of the warning signal 04 or respectively of the reference signal 06 will be explained in greater detail hereinbelow by means of the cross-section in FIG. 2.

Figure 2:
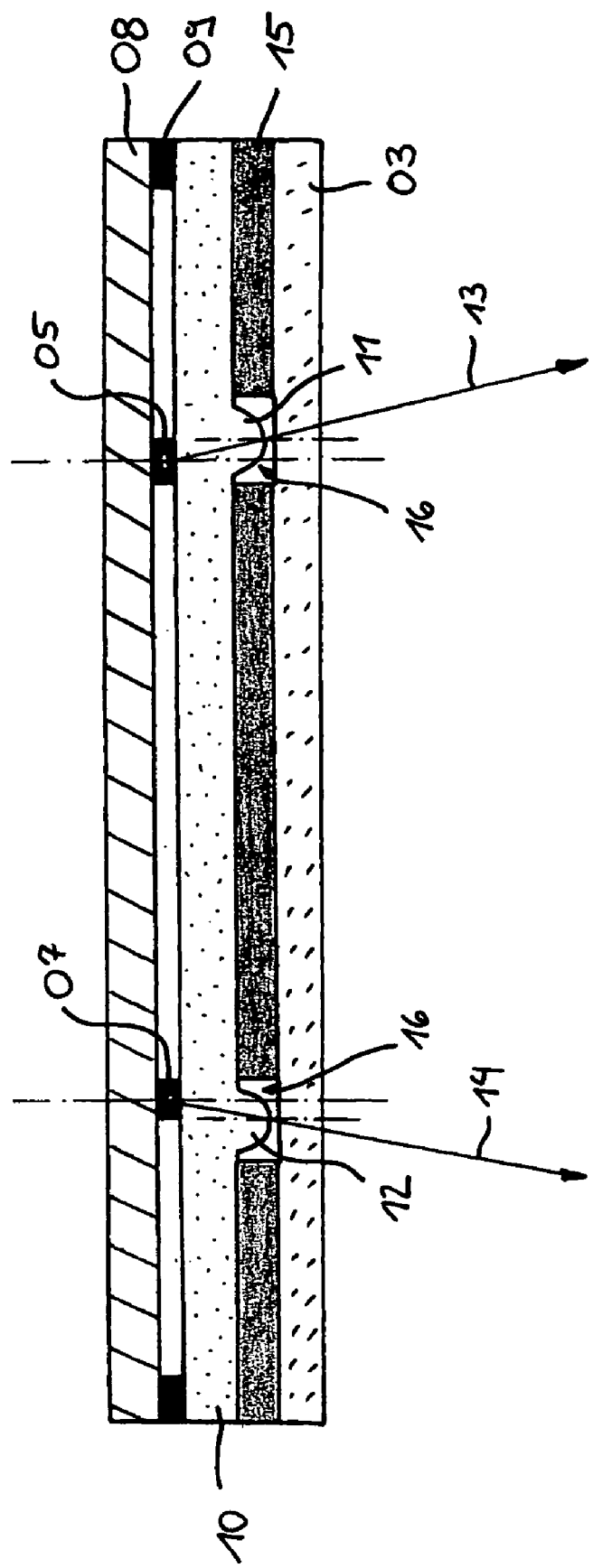
FIG. 2 is a cross-sectional view showing the external rearview mirror according to the invention.

In FIG. 2 the inventive components of the external rearview mirror 01 are illustrated in cross-section. Those components of the external rearview mirror 01 not essential to an understanding of the invention are not illustrated.

Attached behind the partly transparent reflective element 03 is a plate 08 equipped with the lighting means 05 and 07. Here light-emitting semiconductor diodes, which in each case emit punctiform light, are used as lighting means 05 and 07, whereby the contour of the warning signal 04 or respectively of the reference signal 06 is created on the plate 08 by an appropriate arrangement of several lighting means 05 or respectively lighting means 07. In FIG. 2 only one lighting means is shown in each case of the lighting means 05 and 07 forming the warning signal 04 or respectively the reference signal 06.

A transparent plate 10 is attached to the plate 08 using spacers 09, on the side of which facing away from the lighting means 05 and 07 lenticular shapings are formed, acting as convergent lenses 11 and 12. Here the convergent lenses 11 and 12 are assigned to lighting means 05 or respectively 07 in each case, whereby the optical central axis of the convergent lenses 11 and 12 does not in each case run through the center point of the lighting means 05 and 07. Due to this offset between lighting means 05 or respectively 07 to the assigned convergent lens 11 or respectively 12 in each case the result is that the light emitted by the lighting means 05 or respectively 07 is deflected in preset predominant directions 13 and 14. This means in other words that the maximum of the illumination strength of the lighting means 05 is reached whenever it is viewed from a direction corresponding to the predominant direction 13. When the lighting means 07 is viewed, the maximum of the illumination strength is achieved, when the direction of viewing aligns with the predominant direction 14. When the lighting means 05 or respectively 07 are viewed from other directions the respective lighting means 05 or respectively 07 can be recognized only very faintly or can no longer be recognized at all. The result is for example that the traffic behind does not see the warning signals displayed with the lighting means 05, even though the driver clearly recognizes the corresponding warning signal. Vice versa the reference signals displayed by the lighting means 07 are viewed only by the traffic behind, whereas the driver does not see these signals.

To prevent unwanted diffused light, a masking element 15 is provided, which has openings 16 that are spatially complementary to the convergent lenses 11 and 12, is provided between the transparent plate 10 and the reflective element 03.

While a specific embodiment of the invention has been shown and described in detail to illustrate the application of the principles of the invention, it will be understood that the invention may be embodied otherwise without departing from such principles.

What is claimed is:

1. A rearview mirror for a vehicle, the rearview mirror comprising:

a reflective element for observing the traffic behind;

a signaling mechanism with light-emitting lighting means provided on a rear side of the reflective element, the light of the signaling mechanism radiating at a specific angle of radiation in a predominant direction so that the lighting strength on the front side of the reflective element depends on the viewing angle relative to the predominant direction, said light-emitting lighting means having a defined center point and a lighting means optical axis, said lighting means optical axis extending through said center point; and an optical convergent lens having a defined optical central axis, said optical convergent lens having a domed outside surface disposed opposite said lighting means, said lighting means optical axis extending parallel to said optical central axis at a spaced location therefrom such that said optical central axis of said convergent lens does not extend through said center point of said lighting means, whereby said lighting means is located at a position offset from said optical central axis of said optical convergent lens, said optical convergent lens collecting the light signals of the lighting means and deflecting them in the direction of the predominant direction, said optical convergent lens being arranged between the lighting means and the reflective element.

2. The rearview mirror as claimed in claim 1, wherein the light-emitting lighting means is designed as a semiconductor component forming a light-emitting semiconductor diode.

3. The rearview mirror as claimed in claim 1, wherein said optical convergent lens comprises several convergent lenses formed by plural lenticular or domed shapings on the outside of a transparent plate.

4. The rearview mirror as claimed in claim 1, wherein arranged between the lighting means and the reflective element is an opaque masking element, which has openings in the region of the convergent lenses.

5. The rearview mirror as claimed in claim 1, wherein the signaling mechanism radiates light including red light, in the predominant direction, so that maximum illumination strength is achieved when the front side of the reflective element is viewed from the driving position.

6. The rearview mirror as claimed in claim 1, wherein the signaling mechanism radiates light including yellow light, in the predominant direction, so that maximum illumination strength is achieved when the front side of the reflective element is viewed from a position behind the vehicle and/or to the side of the vehicle.

7. The rearview mirror as claimed in claim 1, wherein several substantially point lighting means are arranged along the contours of a warning and/or reference signal on the rear side of the reflective element.

8. The rearview mirror as claimed in claim 7, wherein the warning and/or reference signal is in the form of an arrow and/or triangle and or stroke.

9. The rearview mirror as claimed in claim 8, wherein the brightness of the light radiated by the signaling mechanism is in the region of over 1500 cd/m$^2$ by day.

10. The rearview mirror as claimed in claim 8, wherein the brightness of the light radiated by the signaling mechanism is in the region of 100 to 300 cd/m$^2$ by night.

11. The rearview mirror as claimed in claim 1, wherein the brightness of the light radiated by the signaling mechanism can be changed depending on the measuring result of a sensor, with which the lighting ratios can be measured in the surrounding area.

12. The rearview mirror as claimed in claim 1, wherein the rearview mirror is designed as an outside rearview mirror.

13. The rearview mirror as claimed in claim 1, wherein the rearview mirror is designed as an internal rearview mirror.

14. The rearview mirror as claimed in claim 1, further comprising a transparent plate located between said optical convergent lens and said light-emitting lighting means.

15. A vehicle rearview mirror comprising:
a reflective element for the driver to observe traffic behind the vehicle;
a signaling mechanism with a light-emitting element provided on a rear side of the reflective element, said light-emitting element having a defined center point and a defined light-emitting element axis extending through said center point, the light of the signaling mechanism radiating at a specific angle of radiation in a predominant direction with respect to said light-emitting element axis so that a lighting strength, as viewed from the front side of the reflective element, depends on the viewing angle relative to the predominant direction; and
an optical convergent lens having a defined central optical axis, said optical convergent lens having a curved surface, said optical convergent lens collecting the light of the lighting element and deflecting some of the light into the direction of the predominant direction, said optical convergent lens being arranged between the lighting element and the reflective element, said light-emitting element being disposed opposite said curved surface of said optical convergent lens such that said light-emitting element axis is parallel to said optical central axis of said optical convergent lens, whereby said optical central axis does not intersect said center point of said light-emitting element.

16. The rearview mirror as claimed in claim 15, wherein the lighting element is a light-emitting semiconductor diode and the convergent lens is configured rotationally symmetrically to an optical central axis that does not run through the center point of the lighting element.

17. The rearview mirror as claimed in claim 15, said optical convergent lens and several additional convergent lenses are formed by plural lenticular or domed shapings on the outside of a transparent plate and said lighting element is a light-emitting semiconductor diode arranged with several additional light-emitting semiconductor diodes relative to said lenses.

18. The rearview mirror as claimed in claim 17, further comprising an opaque masking element arranged between said light-emitting semiconductor diodes and the reflective element, wherein openings are located in the region of the convergent lenses.

19. The rearview mirror as claimed in claim 15, further comprising a transparent plate located between said optical convergent lens and said lighting element.

20. A vehicle rearview mirror comprising:
a reflective element for the driver to observe traffic behind the vehicle;
a warning mechanism with a first light-emitting element provided on a rear side of the reflective element, said first light-emitting element having a defined first light-emitting element axis, the light of the warning mechanism radiating at a specific angle of radiation in a first predominant direction so that a first lighting strength, as viewed from the front side of the reflective element, depends on the viewing angle relative to the first predominant direction such that said warning mechanism is viewable only by a driver in the vehicle;
a signaling mechanism with a second light-emitting element provided on a rear side of the reflective element, said second light-emitting element having a defined second light-emitting element axis, the light of the signaling mechanism radiating at a specific angle of radiation in a second predominant direction so that a second lighting strength, as viewed from the front side of the reflective element, depends on the viewing angle relative to the second predominant direction such that said signaling mechanism is viewable only by the traffic behind the vehicle; and
a first optical convergent lens having a defined first central optical axis, said first light-emitting element axis being parallel to said first central optical axis, said first optical convergent lens having a curved surface, said first optical convergent lens collecting the light of the first lighting element and deflecting some of the light into the direction of the first predominant direction, said first optical convergent lens being arranged between the first lighting element and the reflective element, said first light-emitting element being disposed opposite said curved surface of said first optical convergent lens such that said first light-emitting element is located at a position offset from said optical central axis of said first optical convergent lens;
a second optical convergent lens having a defined second central optical axis, said second light-emitting element axis being parallel to said second central optical axis, said second optical convergent lens having a curved surface, said second optical convergent lens collecting the light of the second lighting element and deflecting some of the light into the direction of the second predominant direction, said second optical convergent lens being arranged between the second lighting element and the reflective element, said second light-emitting element being disposed opposite said curved surface of said second optical convergent lens such that said second light-emitting element is located at a position offset from said optical central axis of said second optical convergent lens.

* * * * *